United States Patent Office 2,987,523
Patented June 6, 1961

2,987,523
PROCESS FOR THE PRODUCTION OF 3-METHYL-5-AMINO-PYRAZOLE
Alfred Staub, Binningen, Basel-Land, Switzerland, assignor to J. R. Geigy A.-G., Basel, Switzerland
No Drawing. Filed Aug. 21, 1959, Ser. No. 835,192
Claims priority, application Switzerland Sept. 4, 1958
2 Claims. (Cl. 260—310)

The present invention concerns a new process for the production of 3-methyl-5-amino-pyrazole.

It has been found that 3-methyl-5-amino-pyrazole can be produced in good yields by reacting compounds of the general Formula I

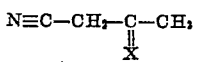
(I)

wherein X represents oxygen or an imino group, with a hydrazine carboxylic acid ester, advantageously in an acid medium, and saponifying the carboxylic acid ester group in the reaction product obtained with alkalies while closing the ring and decarboxylating.

That 3-methyl-5-amino-pyrazole can be produced from 3-methyl pyrazole-5-carboxylic acid ethyl ester in a four-step process by way of the carboxylic acid hydrazide according to Curtius, is already known. According to the literature, however, the yields are at most 25% of the theoretical, calculated on the starting material (see M. J. S. Dewar and F. E. King, Soc. 1945, 114–16, C. Musanto and E. Mugnaini, Gazz. 77, 182 (1948)). Apart from the bad yields, the process is also complicated because, if a pure end product is desired, several intermediate steps have to be isolated. In this respect it is a particular advantage of the process according to the invention that the end product can be obtained, in good yield, direct without isolation of intermediate products; if desired, however, for the purpose of removing side products, intermediate products can also be isolated and then converted into the end products.

The 3-methyl-5-amino-pyrazole can be coupled with diazo compounds in the 4-position. It is a valuable yellow component in azo chemistry. It can also be used as an intermediate product for the production of pharmaceuticals.

The following examples illustrate the invention. Where not otherwise expressly stated, parts are given as parts by weight. The temperatures are in degrees centigrade. The relationship of parts by weight to parts by volume is as that of grammes to cubic centimetres.

Example 1

104 parts of hydrazine carboxylic acid ethyl ester are dissolved in 1000 parts by volume of 2 N-acetic acid. 82 parts of cyanoacetone imine are added to this solution within 5–10 minutes while stirring at 5–10°. After some time, a clear solution is obtained. The solution is stirred for 2 hours at room temperature whereupon crystals begin to separate out. After a further 2 hours, the acetic acid is buffered by the addition of sodium carbonate until the pH is 7–8, whereupon a granular precipitate forms. The precipitate is filtered off under suction and dried in a vacuum at a temperature not exceeding 40°. Yield: 160 parts.

It melts at about 50° and can be recrystallised from ten times the amount of water.

This product is probably the cyanoacetone hydrazone-N-carboxylic acid ethyl ester of the following constitution:

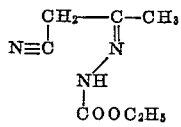

Based on this formula, the yield is 95% of the theoretical.

The product is dissolved in 1500 parts of boiling water and 55 parts of sodium carbonate are added to the solution. When cool, a substance which crystallises into beautiful needles which melt at 113–114° is obtained. According to analysis, the formula is $C_7H_{11}O_2N_3$:

Calculated: C, 49.7%; H, 6.51%; N, 24.85%. Found: C, 49.78%; H, 6.44%; N, 24.86%.

It is probably 3-methyl-5-aminopyrazole-1-carboxylic acid ethyl ester of the marginal formulae

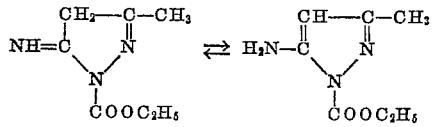

33.8 parts of the compound which melts at 113–114° are added to a boiling solution of 150 parts of crystallised barium hydroxide in 250 parts of water and the whole is boiled for 1 hour. The solution immediately becomes cloudy and barium carbonate is precipitated. The excess barium hydroxide is precipitated by introduction of carbon dioxide in the form of barium carbonate. This is filtered off. The filtrate is concentrated in the vacuum and the residue is distilled in the vacuum. 3-methyl-5-aminopyrazole passes over as a colourless oil at 164° under a pressure of 14 mm. Hg. After some time in a vacuum desiccator, it solidifies. The yield is 16.5 parts.

According to analysis it has the formula $C_4H_7N_3$:
Calculated: C, 49.48%; H, 7.22%; N, 43.30%. Found: C, 49.31%; H, 7.38%; N, 43.12%.

Ebullioscopic determination of the molecular weight showed 105±5 (calculated 97).

3-methyl-5-aminopyrazole is hygroscopic and it deliquesces in the air. It is miscible in any ratio with water, ethanol, acetone, chloroform and benzene but is difficultly soluble in ether and very difficultly soluble in petroleum ether or ligroin. It couples in the 4-position with aromatic diazo compounds such as, e.g. diazotised p-nitraniline. It can be diazotised and the diazo compound can be coupled with coupling components such as, for example, m-phenylene diamine.

With hydrogen chloride, it forms the known hydrochloride which melts at 258°.

On benzoylating with benzoyl chloride in aqueous pyridine solution, the known dibenzoyl derivative which melts at 120–121° is obtained.

Example 2

104 parts of hydrazine carboxylic acid ethyl ester are dissolved in 1000 parts by volume of 2 N-acetic acid. 82 parts of cyanoacetone imine are quickly added to this solution at 0–5° and the whole is stirred for 2 hours at room temperature. At the end of this time, 1000 parts of hot water are added to the solution and it is neutralised while hot by the addition of 100 parts of sodium carbonate. The solution is then cooled whereupon the product described in Example 1 crysallises out in beautiful needles, m.p. 113–114°. The solution is cooled to 0°, the crystals are filtered off under suction and dried. 151 parts of $C_7H_{11}O_2N_3$ are obtained.

17 parts of this compound which melts at 113–114° are dissolved in 100 parts of hot water, 30 parts of concentrated caustic soda lye are added and the whole is heated for 15 minutes at 80–90°. On acidifying the solution, carbon dioxide is given off. The solution contains 3-methyl-5-aminopyrazole in over 80% of the theoretical, calculated on the starting substance which melts at 113–114° (determined by coupling with p-nitrodiazobenzene).

If the product which melts at 113–114° is heated for some time at a temperature beyond that of the melting point, for example, at 125–130°, then it is rearranged into an isomeric compound which melts at 173–174° and has the composition $C_7H_{11}O_2N_3$.

Calculated: C, 49.70%; H, 6.51%; N, 24.85%. Found: C, 49.71%; H, 6.64%; N, 24.83%.

On saponifying and simultaneously decarboxylating this isomeric ester (m.p. 173–174°), 3-methyl-5-aminopyrazole is also obtained. It is identified by the dibenzoyl derivative which melts at 120–121°.

If, instead of hydrazine carboxylic acid ethyl ester, the corresponding methyl, propyl, benzyl or phenyl ester is used and otherwise the same procedure is followed, then 3-methyl-5-aminopyrazole is also obtained.

Example 3

104 parts of hydrazine carboxylic acid ethyl ester are dissolved in 1000 parts by volume of 2 N-acetic acid. 82 parts of cyanoacetone imine are added to this solution while stirring and after some time, a clear solution is obtained. The solution is stirred for half an hour at room temperature, 340 parts by volume of concentrated caustic soda lye are then added and the whole is warmed to 50° whereupon ammonia is given off. The solution is then acidified with about 500 parts by volume of concentrated hydrochloric acid whereupon carbon dioxide is given off. The solution now contains 3-methyl-5-aminopyrazole.

The content of the solution determined by titration with sodium nitrite corresopnds to a yield of 95% of the theoretical, calculated on the cyanoacetone imine used. The aqueous solution of 3-methyl-5-aminopyrazole can be used direct in condensation or coupling reactions.

Example 4

104 parts of hydrazine carboxylic acid ethyl ester are dissolved in 1000 parts by volume of 2 N-acetic acid. 83 parts of cyanoacetone are added while stirring at 5–10°. After some time, a clear solution is obtained. The solution is stirred for 2 hours and then 100 parts of sodium carbonate are added. The solution is cooled to 0° whereupon crystallisation quickly occurs. The intermediate product described in Example 1 which has crystallised out and melts at 113–114° (probably 3-methyl-5-aminopyrazole-1-carboxylic acid ester) is filtered off under suction. 162 parts are obtained which corresponds to a yield of 97% calculated on the hydrazine carboxylic acid ethyl ester. This product is dissolved in 1000 parts by volume of water, 350 parts of concentrated caustic soda lye are added and the solution is warmed to 50°. The solution is then acidified with 500 parts by volume of concentrated hydrochloric acid whereupon carbon dioxide develops. The solution now contains 3-methyl-5-aminopyrazole. The yield, determined by titration with sodium nitrite, corresponds to 85% of the theoretical calculated on the starting substance.

What I claim is:

1. The method which comprises reacting a compound of the formula

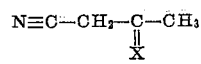

wherein X represents a member selected from the group consisting of O and NH with an N-unsubstituted hydrazine carboxylic acid ester in acid medium, then treating the reaction product with alkali with resultant ring closure, and then saponifying and decarboxylating the ring compound to obtain 3-methyl-5-amino-pyrazole.

2. The method which comprises reacting cyanoacetone imine with an N-unsubstituted hydrazine carboxylic acid lower alkyl ester in acid medium, then treating the reaction product with alkali with resultant ring closure, and then saponifying and decarboxylating the ring compound to obtain 3-methyl-5-amino-pyrazole.

References Cited in the file of this patent
UNITED STATES PATENTS 2,725,384    Burness _____ Nov. 29, 1955

OTHER REFERENCES

Huckel et al.: Chem. Abstracts, vol. 31, col. 8533 (1937).

Elderfield: "Heterocyclic Compounds," vol. 5, p. 139 (1957).